Patented Nov. 11, 1941

2,262,729

UNITED STATES PATENT OFFICE 2,262,729

MANUFACTURE OF FROZEN CONFECTIONS

George Waid, Springfield, Vt., assignor of one-half to A. Linton Bausman, Springfield, Mass.

No Drawing. Application January 10, 1941,
Serial No. 373,957

2 Claims. (Cl. 107—54)

My invention relates to improvements in methods for making frozen confections and it is directed more particularly to the provision of an improved method whereby there may be more efficiently and economically produced a frozen confection consisting of a body of a frozen and edible material such as ice cream.

It is a principal object of my invention to provide a novel method for making ice-cream confections which is particularly efficient in that the frozen bodies may be readily made, in a manner which will presently appear, so that their desired degree of congealment is not disturbed.

The article produced by the method of my invention comprises a body of some frozen and edible material, such as ice cream, and while said body is preferably mound-like in shape, it may be substantially spherical, semi-spherical, or otherwise.

It will also be understood that while the frozen material will usually be ice cream, it may just as well be an ice or sherbet, or some other congealed and edible substance. If a covering or coating material is used, such as a chocolate or other candied material, it will be likewise edible.

As a still further object, my invention provides for the manufacture of frozen confectionery bodies in such a way that the latter are not adversely affected with respect to their frozen condition. Also, they are so treated that the attainment of the resulting frozen product is facilitated. That is to say, the process is such that frozen bodies or confections are quickly and efficiently provided and are adapted for immediate distribution and sanitary handling in a way which is satisfactory to the mind of the most fastidious customer.

One objection to the present and common method of dispensing a frozen confection, such as ice cream, is that the clerk must dip a scoop into the container to remove the desired quantity. Invariably, and almost necessarily, because of the usual conditions, the scoop is more or less tainted with foreign matter so that the cream is not dispensed as sanitarily as is desired and there is no satisfactory control over either the shape or the size of the confection.

I am aware that fluids have heretofore been poured into individual metallic molds and frozen therein to be subsequently removed therefrom for separate distribution, but I wish to point out that according to this invention a plurality of confections may be made simultaneously. Furthermore, individual confections may be formed into desired shapes and sizes so as to permit the commercially-satisfactory dispensing or distribution of the same. Also, I overcome the objection of such prior practices in that the great expense of such heavy metal molds is entirely avoided and the great delay in former methods is completely obviated.

Furthermore, through my invention, the ice cream or other frozen material may be dispensed in any quantity desired without the use of an unsanitary scoop. In other words, my method provides for a ready and sanitary distribution of frozen confections of the desired sizes in a way which is commercially practicable and profitable.

With the foregoing and various other novel features and advantages and other objects of my invention as will become more apparent as the description proceeds, the invention consists in certain novel features as will be hereinafter more particularly pointed out in the claims hereunto annexed and more fully described and referred to in connection with the accompanying specification.

According to the preferred form of the method of my invention, there is employed a relatively shallow tray which is filled with some granular or powdery material, such as starch, and this is preferably packed down to a certain extent. The particular kind of powder-like material may vary widely.

The operations of my method are preferably performed in a cold compartment and the starch if pre-cooled has been found to produce the most desired results.

The shallow tray is fed through a machine which includes a reciprocating member having projections extending therefrom and the arrangement is such that the trays are fed successively therethrough. The reciprocating member reciprocates to press the projections into the starch or other powdery material so as to form cavities or depressions therein. The shape of the projections and their size depends, of course, upon the shape and size which the confection is to have.

The trays are then subjected to a cooling process whereby the temperature of the powder-like or granular material is reduced to a desirable degree as will soon be explained. When cooled, the trays are then fed through a depositing device which fills the cavities with the freezable material, as for example an ice-cream-forming, semi-fluid material, which is originally flowable and now becomes hardened in the cavities by the cooling process which promptly follows.

After the confections are sufficiently hardened,

I dump them into a sieve, which is preferably brush-lined. Then the sieve is vibrated so that the powdery material which tends to adhere to the frozen body is brushed off and passes through the sieve. The brushes serve to remove the starch from the frozen cream as the sieve is vibrated.

The confections may then, if desired, be placed on a traveling belt which passes through a coating machine which covers or encases the bodes with chocolate or with whatever other material it is desired that the shell shall consist of.

As will be obvious, since the article consists of some freezable material, it is essential that the temperature of the same be not appreciably raised during the treatment thereof. That is to say, the frozen confection, such as ice cream, must be originally in a semi-flowable condition, at least, in order that the bodies of the desired shape and size may be formed. As will be clear, care must be taken that, when handling the bodies, their temperature is maintained. That is to say, there must be no transfer of heat to the ice cream so as to cause any appreciable rise in the temperature thereof.

I have provided for the cavity-forming material in the trays to be cooled substantially, before the cream is poured thereinto, to a temperature at least as cold as the fluid. Preferably the starch is pre-cooled to a temperature below that of the freezable material so as not only to prevent its becoming less congealed but also to hasten its hardening.

The cooling of the granular material may be performed either before or after the cavities or depressions are formed and the temperature to which it is cooled down may clearly vary.

In any event, it is such that when the ice cream, which is soft enough to be forced through nozzles in the usual case for deposit in the cavities, is not further softened by warm starch or the like. As stated, the starch is preferably a little colder than the ice cream so as to draw the heat from it.

After the ice cream has been deposited in the cavities, it is then frozen very hard so that when the bodies are subsequently put into the sieve they will not melt or their desired condition will not be otherwise disturbed and the starch can be readily and efficiently removed from the ice cream.

It will be appreciated that the cooling of the starch prior to the depositing of the semi-fluid into the cavities permits material which has heretofore been difficult to handle to be treated in a novel and satisfactory manner and that the powder-like material may be easily separated therefrom.

From the above it will be apparent that the method may be carried out within a room or compartment in which the temperature is most conducive to the practice of the invention. The material in which the cavities are made is lowered to a temperature that will not injuriously affect the material for filling the cavities and such a low temperature may be arrived at by cooling the trays before or after forming the cavities, or the temperature of the compartment in which the process is practiced may be such as to provide the low temperature.

The powdery material is preferably of fine grain such as starch and, I have found, is readily removed from the congealed cold temperature.

While I have described my invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. The process of making a frozen confection which consists in, forming cavities in powder-like material for material adapted to be frozen into objects of the general shape of said cavities and adjusting the temperature of the powder-like material so that it is appreciably lower than room temperature, pouring semi-fluid freezable object forming material into said cavities, lowering the temperature of the powder-like and freezable materials to congeal and freeze the latter to provide substantially rigid objects, and finally in separating said objects and powder-like material.

2. The process of making substantially solid ice cream and similar objects which consists in, providing cavities in which the objects are to be formed in a mass of powder-like material, lowering the temperature of said material to a certain point appreciably below that of object forming material with which said cavities are to be filled, filling said cavities with semi-fluid object forming material adapted to be frozen into substantially solid and rigid ice-cream objects, and in subjecting the mass of powder-like material and object forming material in the cavities to a freezing temperature for the material and below said certain point thereby to freeze the same and form frozen substantially solid and rigid ice-cream objects in said cavities, and finally in separating the frozen objects from the powder-like material.

GEORGE WAID.